United States Patent [19]

Schisler et al.

[11] Patent Number: 5,205,546
[45] Date of Patent: Apr. 27, 1993

[54] HYDRO-ELASTIC ENGINE MOUNT

[75] Inventors: Robert C. Schisler, Munroe Falls; George W. Eisenzimmer, Akron, both of Ohio

[73] Assignee: The Goodyear Tire & Rubber Company, Akron, Ohio

[21] Appl. No.: 833,209

[22] Filed: Feb. 10, 1992

[51] Int. Cl.$^5$ .............................................. F16F 13/00
[52] U.S. Cl. ............................ 267/140.13; 267/219
[58] Field of Search ............ 267/140.1 A, 140.1 AE, 267/140.1 E; 248/636, 638, 562, 566, 550; 180/300

[56] References Cited

U.S. PATENT DOCUMENTS

| | | | |
|---|---|---|---|
| 4,712,777 | 12/1987 | Miller | 267/140.1 A |
| 4,720,084 | 1/1988 | Hollerweger et al. | 248/562 X |
| 4,756,513 | 7/1988 | Carlson et al. | 248/636 X |
| 4,802,648 | 2/1989 | Decker et al. | 267/140.1 E X |
| 4,840,358 | 6/1989 | Hoying et al. | 267/140.1 AE |
| 4,886,251 | 12/1989 | Häussermann | 267/140.1 A |
| 4,886,252 | 12/1989 | Häussermann | 267/140.1 A |
| 4,901,986 | 2/1990 | Smith | 267/140.1 AE |
| 5,114,124 | 5/1992 | Muramatsu | 248/636 |

FOREIGN PATENT DOCUMENTS 440260 8/1991 European Pat. Off. ............ 248/636

Primary Examiner—Robert J. Oberleitner
Assistant Examiner—Kevin D. Rutherford
Attorney, Agent, or Firm—Marc R. Dion, Sr.

[57] ABSTRACT

An engine mount for motor vehicles having two enclosed chambers containing hydraulic fluid, which chambers are separated from each other by a partition containing a damping channel passing therethrough to permit hydraulic fluid to flow back and forth between the chambers to damp vibrations imparted to the mount. The engine mount is equipped with a decoupling unit within one of the hydraulic chambers for coupling and decoupling the damping action of the mount in response to varying driving conditions and engine performance. The decoupling unit has a rigid member forming a cavity into which a flexible diaphragm is deflected when vibrations occur when the decoupling unit is set in a decoupling mode to prevent fluid from being pumped back and forth through the damping channel.

11 Claims, 6 Drawing Sheets

HYDRO-ELASTIC ENGINE MOUNT

This invention relates generally to hydro-elastic engine mounts for applications such as motor vehicles and more specifically to various devices for coupling and decoupling the vibration damping characteristics of the mount in response to changes in driving and engine operating conditions.

BACKGROUND OF THE INVENTION

Various devices have been designed in the past to provide means of partially or fully decoupling and coupling the vibration damping characteristics of hydraulic mounts for engines for motor vehicles in response to changes in driving and engine operating characteristics. Because damping forces add to spring forces to create a high dynamic rate (force/deflection); it is desirable to eliminate the damping when it is not needed. Therefore, most hydro-elastic mount designs include devices that de-activate or "decouple" the damping for relatively small amplitude flexing.

A typical engine mount contains two sealed chambers separated by an intermediate partition having a damping channel passing therethrough and providing communication between the chambers. The engine mount normally has one end member attached to an engine block and another end member attached to a vehicle frame, with the end members being resiliently connected to each other by an elastomeric member which permits one end member to move in response to vibrations with respect to the other. In order to damp vibrations between the two end members, hydraulic fluid is pumped back and forth from one chamber to the other through the damping channel in the partition. In order decouple the damping action, it is necessary to prevent the hydraulic fluid from flowing back and forth through the channel by providing another alternative response to vibrations which would normally tend to pump the hydraulic fluid through the damping channel.

One type of device for adjusting damping in an engine mount is the use of an inflatable bladder mounted inside the primary fluid chamber as shown in U.S. Pat. Nos. 4,840,358 and 4,901,986.

Another approach to the problem is shown in U.S. Pat. No. 4,886,251 in which an inflatable diaphragm inside the pressure chamber forms an air chamber with the end member and an elastomeric spring member. When air pressure is inserted into the air chamber, the diaphragm is lifted off the spring member and bears against the annular partition wall and prevents any vibration from being transmitted from the elastomeric spring member to the damping fluid in the pressure chamber. This causes decoupling of any damping which would otherwise occur if the air chamber were not inflated.

U.S. Pat. No. 4,886,252 shows decoupling of the damping action of the engine mount by changing the wall area or volume of the damping channel.

U.S. Pat. No. 4,712,777 shows another decoupling device which uses an air chamber covered by a diaphragm adjacent to the fluid pressure chamber of the engine mount. The diaphragm contains a shutter panel which can be closed to isolate the diaphragm from the pressure chamber. When the diaphragm is isolated from the pressure chamber, fluid is pumped through the damping channel by vibration imparted to the fluid. When the shutter panel lifts off a seated position and exposes the diaphragm to communication with the pressure chamber, then deflection of the diaphragm will occur in response to vibrations imparted to the fluid, and such deflection will result in either partial or complete decoupling of the damping action by reducing or preventing fluid from flowing through the damping channel. The present invention is intended to provide certain advantages over the prior art decoupling devices as will be described in the following specification.

OBJECTS OF THE INVENTION

It is a primary object of this invention to provide a simple and effective device for decoupling vibration damping in a vehicle engine mount, which device is easy to manufacture, install and maintain.

Another object of this invention is to provide a decoupler for vibration damping in an engine mount, which is versatile and has a wide range of control options for varying the amount of decoupling, depending upon the driving conditions and engine performance.

Still another object of this invention is to provide a vibration damping decoupler which can alternately adjust the engine mount condition to firm, soft or intermediate.

These and other objects of the invention will become more fully apparent in the following specification and the attached drawings.

SUMMARY OF THE INVENTION

This invention is a hydro-elastic engine mount for mounting an engine on a vehicle frame the mount comprising: a first end member, a second end member spaced in an axial direction from the first end member, an annular elastomeric spring element sealingly attached to the first end member, an annular sidewall extending between the elastomeric spring element and the second end member to form an enclosed chamber between the first and second end members, a partition inside the enclosed chamber dividing it into a main fluid chamber and an auxiliary fluid chamber, said partition containing a damping channel therethrough which permits fluid to flow back and forth between the main fluid chamber and the auxiliary fluid chamber when certain vibration conditions occur to provide relative vibration damping between the first and second end members, and a coupling/decoupling means mounted inside the main fluid chamber to alternately couple and at least partially decouple the vibration damping action of the fluid flow through the damping channel said coupling-/decoupling means comprising: a rigid body member having a concave wall forming a cavity with an open side facing on the inside of the main fluid chamber, a flexible extensible elastomeric diaphragm sealingly attached to the rigid body member and covering the open side of the cavity at a spaced distance from the concave wall of the body member, said diaphragm being deflectable into the cavity a distance relative to the pressure differential between the fluid pressure in the main fluid chamber and the air pressure in the cavity, the body member having a port extending through the concave wall thereof and in communication with the exterior of the engine mount to permit the flow of air in and out of the cavity, and means to control the flow of air through the port in and out of the cavity to effect pressure changes within the cavity and thereby change the amount of deflection of the diaphragm.

DESCRIPTION OF THE PREFERRED EMBODIMENTS

Figure 1:
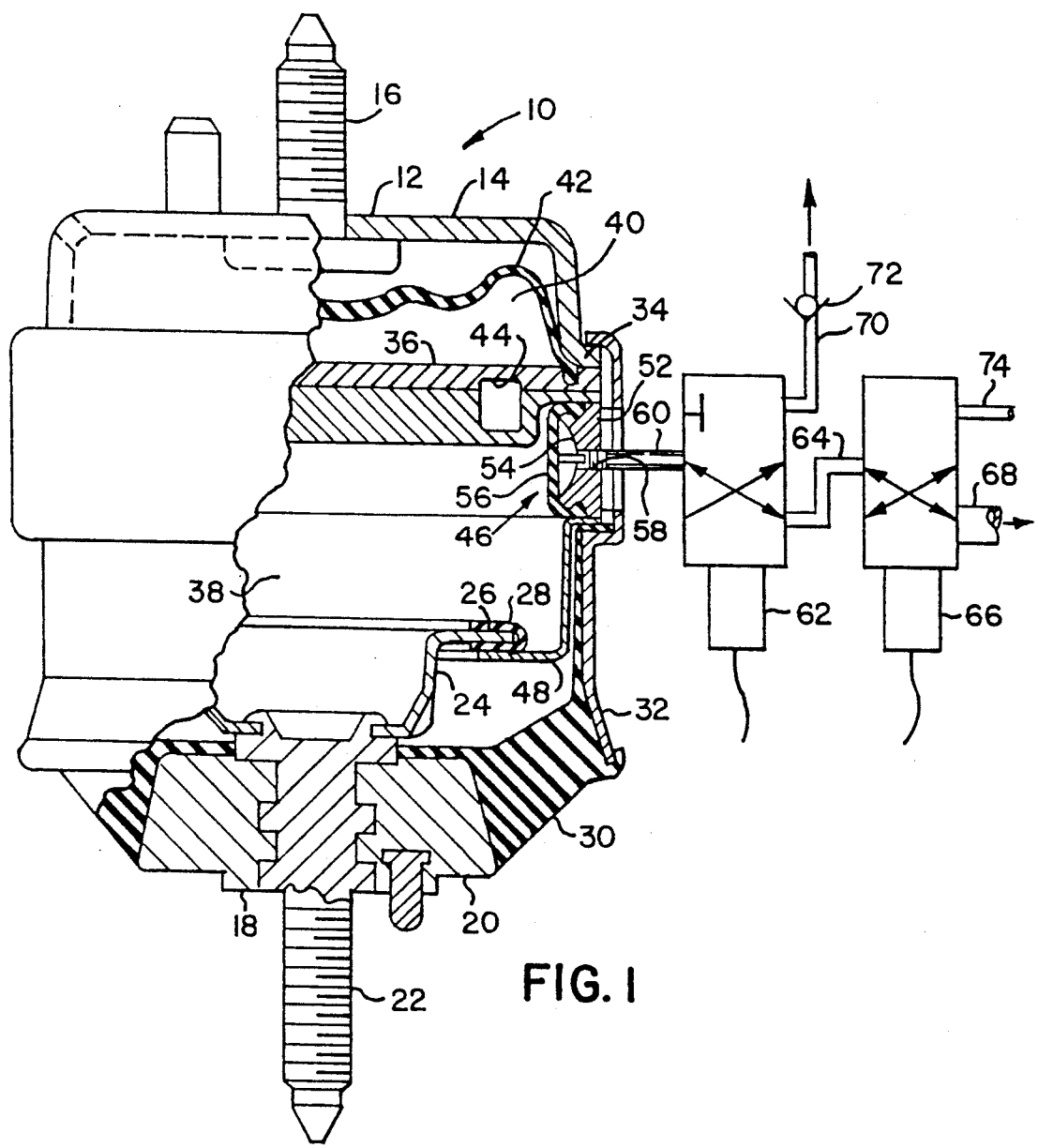
FIG. 1 is a side elevational view of one embodiment of the invention with portions broken away to show the interior construction of the device of the invention.

Referring now to the drawings and in particular to FIG. 1, a hydro-elastic engine mount is indicated generally by the numeral 10. The mount 10 has an end member 12 which includes a vented metal cap 14, from which projects a centrally located threaded stud 16 for attachment to an engine block (not shown).

The mount 10 also has an opposite end member 18 which has an annular collar member 20 with a threaded stud 22 extending outwardly therefrom, for attachment to a vehicle frame (not shown). A flanged cup member 24 is attached to the inner end of the stud 22. The cup member 24 has a radially outwardly extending flange 26 on which is carried an annular elastomeric bumper ring 28.

An annular elastomeric spring element 30 surrounds and is adhered to the outer circumference of the collar member 20. The spring element 30 is also adhered at its outer circumference to one end of a substantially cylindrical shaped can member 32 which has its opposite end bent inwardly to engage a lower flanged edge 34 on the cap 14. The end members 12 and 18, the spring 30 and the can member 32 form an enclosed container. A disk shaped partition member 36 inside the can member 32 divides the interior of the container of the engine mount 10 into two chambers; one being a working fluid chamber or pressure chamber 38 and the other an auxiliary or compensating chamber 40.

Since the cap 14 is vented it is necessary to clamp the peripheral edge of a flexible disk shaped diaphragm 42 between the partition 36 and the lower edge of the cap 14 so that hydraulic fluid can be contained within the auxiliary chamber 40 without running out through any vent holes in the cap 14.

The partition 36 contains an annular damping channel 44 which has one end in communication with the pressure chamber 38 and the other end in communication with the auxiliary chamber 40 so that hydraulic fluid can flow back and forth between the chambers 38 and 40 to provide vibration damping as will be explained later.

An annular decoupler unit indicated generally by the numeral 46 is mounted inside the can 32 between the partition 36 and a flange of a stop ring 48. The stop ring 48 has a radially inwardly extending flange which engages the bumper ring 28 to limit the distance of travel of the end member 18 and prevent excess flexing of the spring 30 due to large engine movements.

The decoupler unit 46 has an annular rigid ring member 52 having a radially inwardly facing annular concave cavity 54. The cavity 54 is covered by a flexible extensible elastomeric diaphragm 56 clamped in retaining grooves on each side of the cavity 54. The diaphragm 56 forms an airtight seal with the ring 52 except for an inlet/outlet port 58 which is connected to a tube 60 extending through the wall of the can member 32 and connected to a solenoid valve 62.

The solenoid valve 62 is in turn connected through a tube 64 to another solenoid valve 66. The solenoid valve 62 is presently shown in position to provide open communication between the cavity 54 and the solenoid valve 66 which is presently shown as vented to the outside atmosphere through a large orifice 68.

The solenoid valve 62 also has an off position and a position where the cavity 54 is put in communication with a tube 70 leading to a check valve 72. The solenoid valve 66 also has an off position and a position where the tube 64 is put in communication with a small or restricted orifice 74. The small orifice 74 is sized to provide an optimum level of damping for a specific engine/body/driving condition combination. The amount of damping obtained varies inversely with the size of the orifice.

Figure 3:
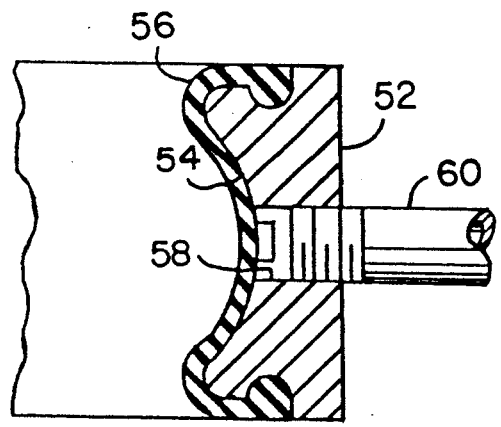
FIG. 3 is a greatly enlarged fragmentary view of an annular ring type decoupler with a diaphragm of the decoupler being drawn into an annular cavity.

In operation, when the engine mount 10 is mounted on a vehicle (not shown), the interior of the mount 10 is filled with a sufficient amount of liquid so that when vibration occurs and is imparted through the spring member 30 and the end member 18, liquid can be pumped back and forth between the pressure chamber 38 and the auxiliary chamber 40 through the damping channel 44, thereby providing damping of the vibration. In order to have full damping, the decoupler must be disengaged. To accomplish this, the solenoid valve 62 is moved to the position where the cavity 54 is in communication with the check valve 72. As the vibration deflects the diaphragm 56 inwardly into the cavity 54, air is ejected through the check valve 72 but cannot return to the cavity 54. As a result of the vibration, the air is rapidly pumped out of the cavity until the diaphragm 56 is drawn completely against the concave wall of the cavity 54, as shown in FIG. 3. This creates the same effect as though there, was no decoupler and full damping continues until there is a change in the position of the solenoid valves.

To provide partial decoupling, the solenoid 62 is moved to the position shown in FIG. 1, however solenoid 66 is moved to the position where the tube 64 is in communication with the small or restricted orifice 74. In this intermediate position, there is about ⅛ to ½ of full damping. When both solenoid valves are in the position shown in FIG. 1, the damping is almost fully decoupled and very little damping is occurring. In this valve position, the diaphragm 56 can deflect freely in and out of the cavity 54 to decrease the fluid pressure peaks sufficiently that vibrations acting on the fluid will not cause the fluid to flow through the damping channel.

While in FIG. 1 the solenoid valves 62 and 66 are shown connected in a series it should also be recognized that they can be connected in parallel or can be connected individually or only one or the other of the two valves need be connected to the cavity 54.

Figure 2:
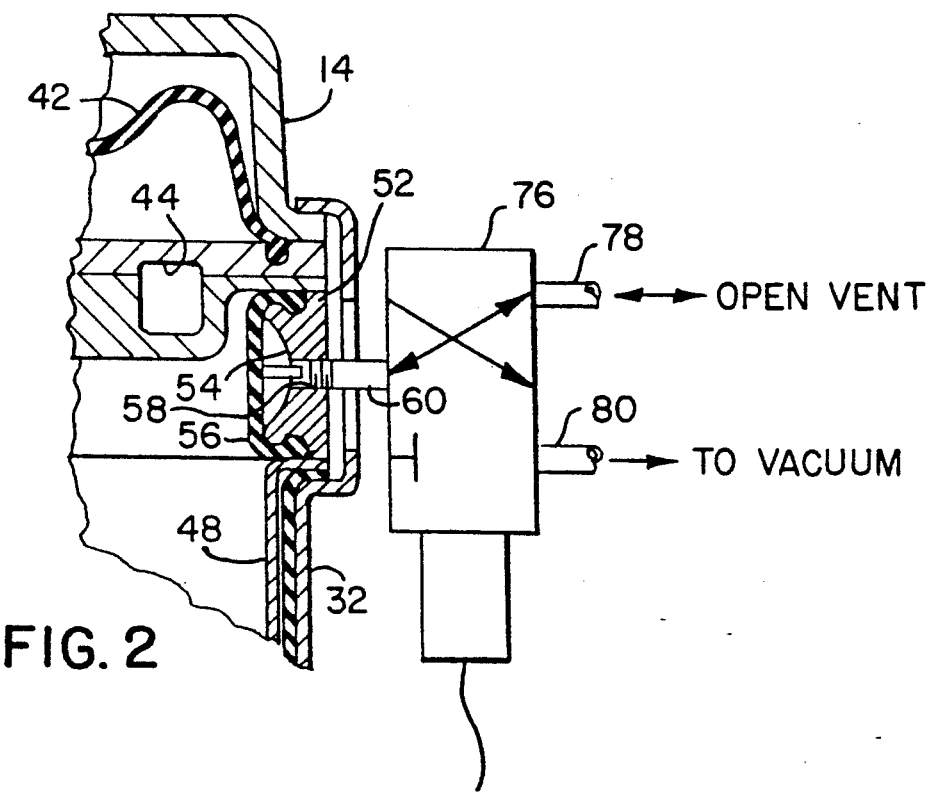
FIG. 2 is an enlarged fragmentary view of an annular ring type decoupling device in another embodiment of the invention.

FIG. 2 shows another embodiment of the invention using a solenoid valve 76 having one port 78 open for full venting and another port 80 connected to vacuum to withdraw air from the cavity 54 and draw the diaphragm 56 down against the wall of the cavity 54 as shown in FIG. 3. This performs the same function as the use of the one-way check valve 72 in FIG. 1. When the diaphragm is fully drawn into the cavity 54, the full damping is in effect. When the solenoid is moved to the position where the cavity 54 is in communication with open port 78, there is full venting to the atmosphere and the damping is fully decoupled. Since all the parts of the device shown in FIG. 2 except the solenoid valve 76 are identical to those shown in FIG. 1 the same numerals will be used to identify similar parts and they will not be described separately in the specification.

Figure 4:
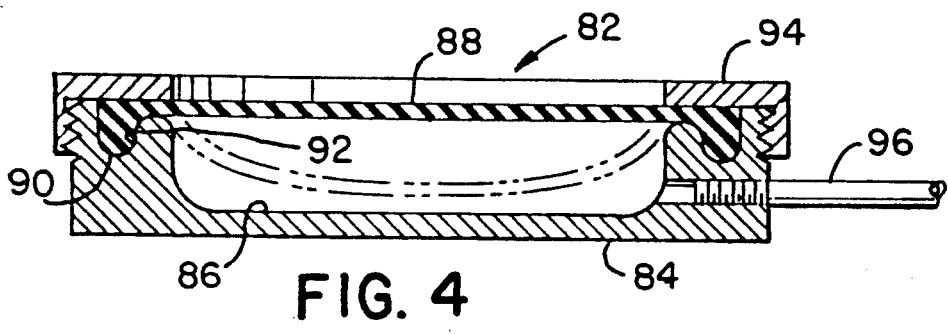
FIG. 4 is a cross-sectional view of another embodiment of the invention showing a disk shaped decoupler.

While the decoupler 46 has been shown as being of annular configuration in FIGS. 1 through 3, It will also be recognized that a similar effect could be obtained from a disk shaped member such as the decoupler 82 shown in FIG. 4. The decoupler 82 is comprised of a rigid circular body member 84 having a centrally located cavity 86 therein. A circular diaphragm 88 extends across the cavity 86 and has an annular rib 90 which engages an annular groove 92 to hold the diaphragm 88 firmly at the edges when a clamp ring 94 is screwed onto the body member 84. An inlet/outlet tube 96 extends from the cavity 86 for connection to a solenoid valve as will be explained later in the description of FIG. 5.

Figure 5:
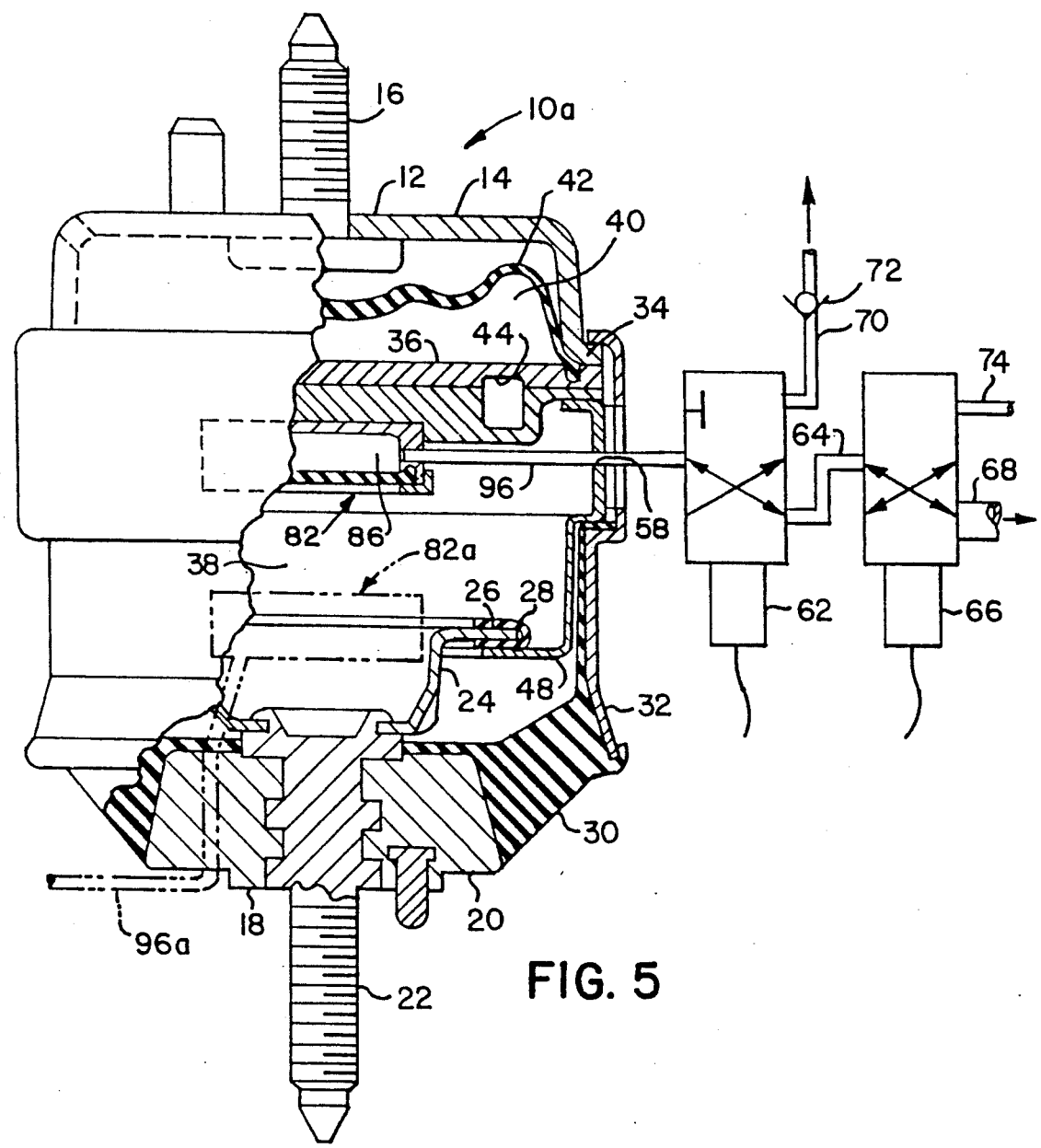
FIG. 5 is a side elevational view of another embodiment of the invention with portions broken away to show a disk shaped decoupler located in two different alternative positions.
Figure 6:
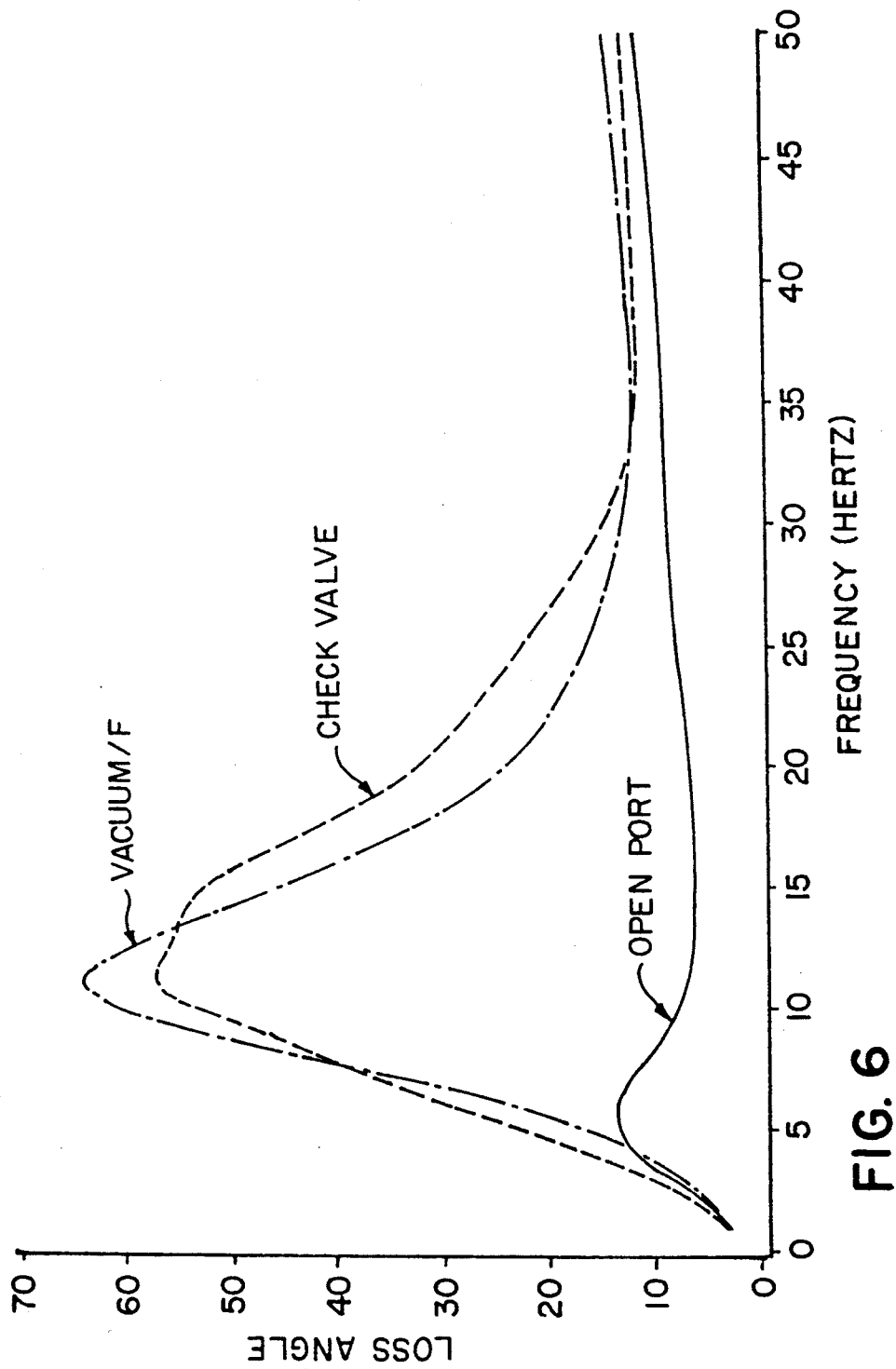
FIG. 6 is a test data graph showing a comparison of the performance of a decoupler used in three different operating modes including a vacuum, a check valve and an open port.
Figure 8:
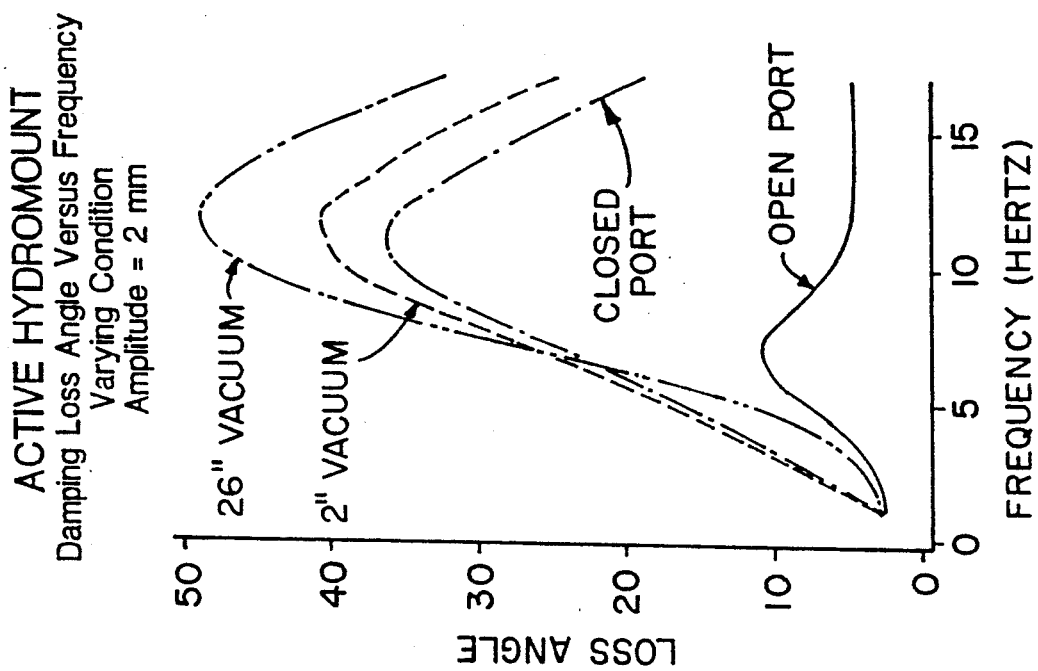
FIG. 8 is another test data graph showing a comparison of the damping loss angle of the same modes shown in FIG. 7.
Figure 7:
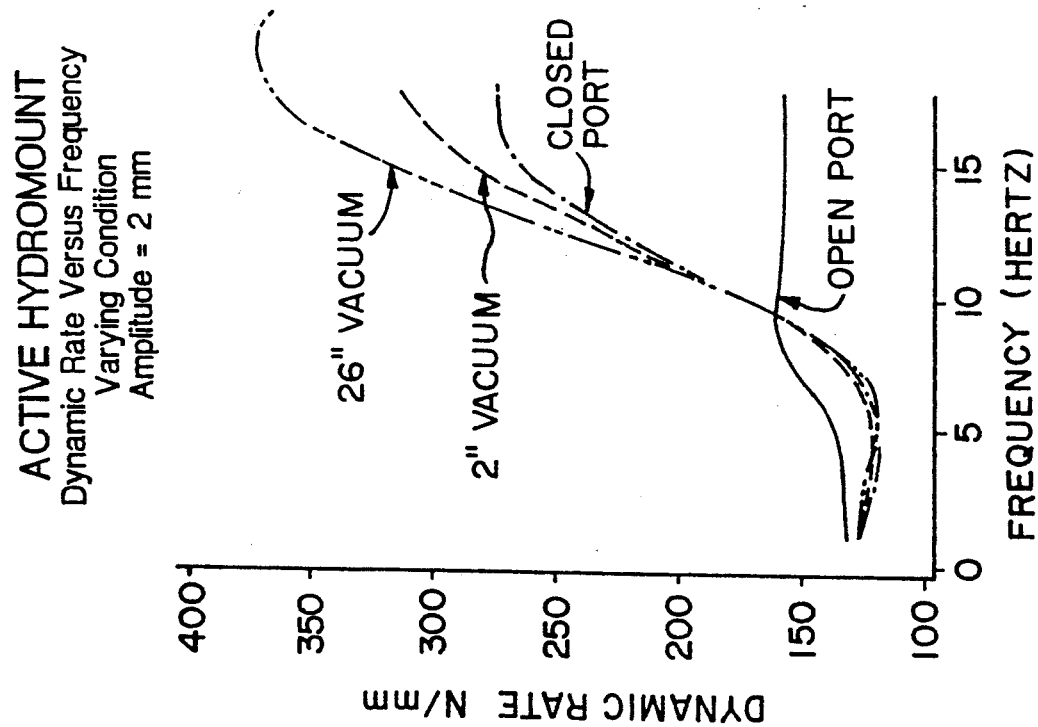
FIG. 7 is another test data graph showing a comparison of the dynamic rates of a decoupler in four different modes including an open port, a closed port and two different amounts of vacuum.

FIG. 5 shows an engine mount 10a which is identical to the mount in FIG. 1 except that instead of using the annular decoupler 46 it uses the disk shaped decoupler 82 shown in FIG. 4. For simplicity, since all parts except the decoupler are identical to those of FIG. 1, the identical parts will be identified with the same numerals as the parts in FIG. 1 and the identical parts will not be described again in detail.

FIG. 5 is presented merely to show two different possible locations where the disk shaped decoupler 82 may be mounted within the pressure chamber 38 as an alternative to using the annular decoupler 46.

As shown in solid lines, the decoupler 82 may be mounted on the partition 36 with the cavity 86 facing into the pressure chamber 38. An inlet/outlet tube 96 connects the cavity 86 to the solenoid valve 62 and through the tube 64 to the solenoid valve 66. The diaphragm 88 deflects into the cavity 86 (as shown in ghost lines in FIG. 4) in the same manner as the diaphragm 56 and functions in the same manner with respect to the solenoid valves 62 and 63 as was previously described regarding the annular decoupler 46.

Likewise the decoupler 82 may be mounted on the flanged cup member 24 on the bottom end member 18 as indicated by ghost lines and identified as 82a. The inlet/outlet tube 96a can extend out through the bottom member 18.

The test data graphs shown in FIGS. 6 through 10 show a comparison of the performance of the decoupler of the invention in different modes depending upon whether a cavity of the decoupler is connected to a certain amount of vacuum, or to a check valve, or is sealed by a closed solenoid valve, or is open to one of several different size vent orifices which are open to the atmosphere.

Figure 10:
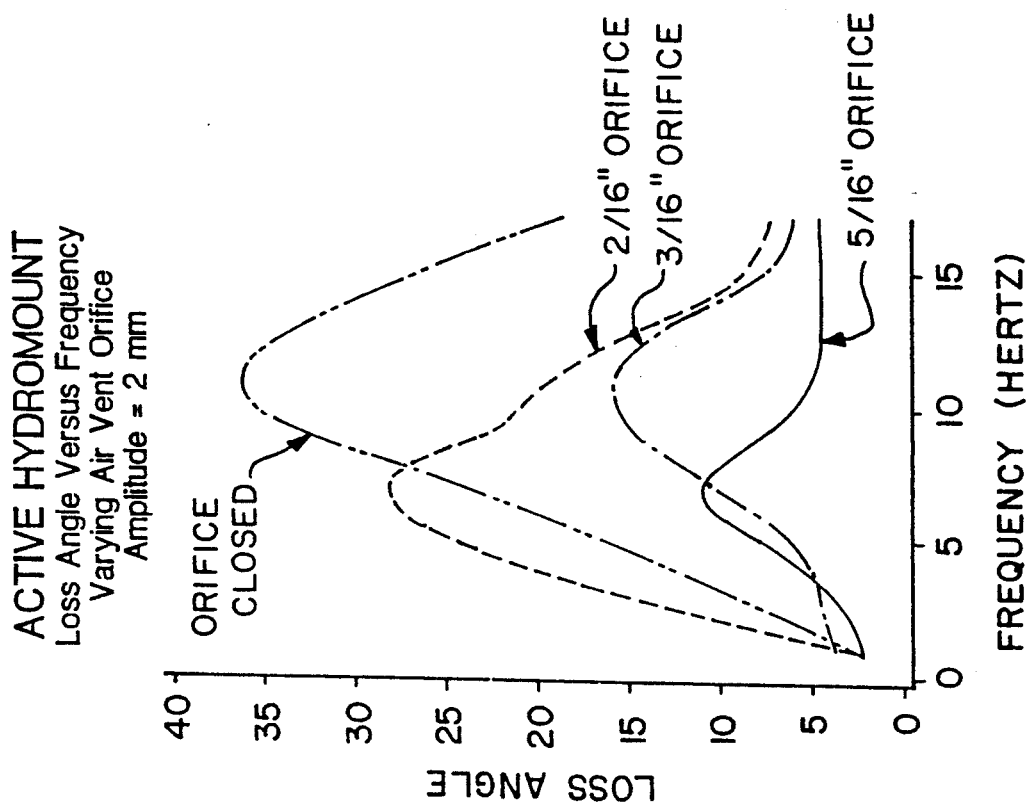
FIG. 10 is still another test data graph showing a comparison of the loss angle of the same modes shown in FIG. 9.
Figure 9:
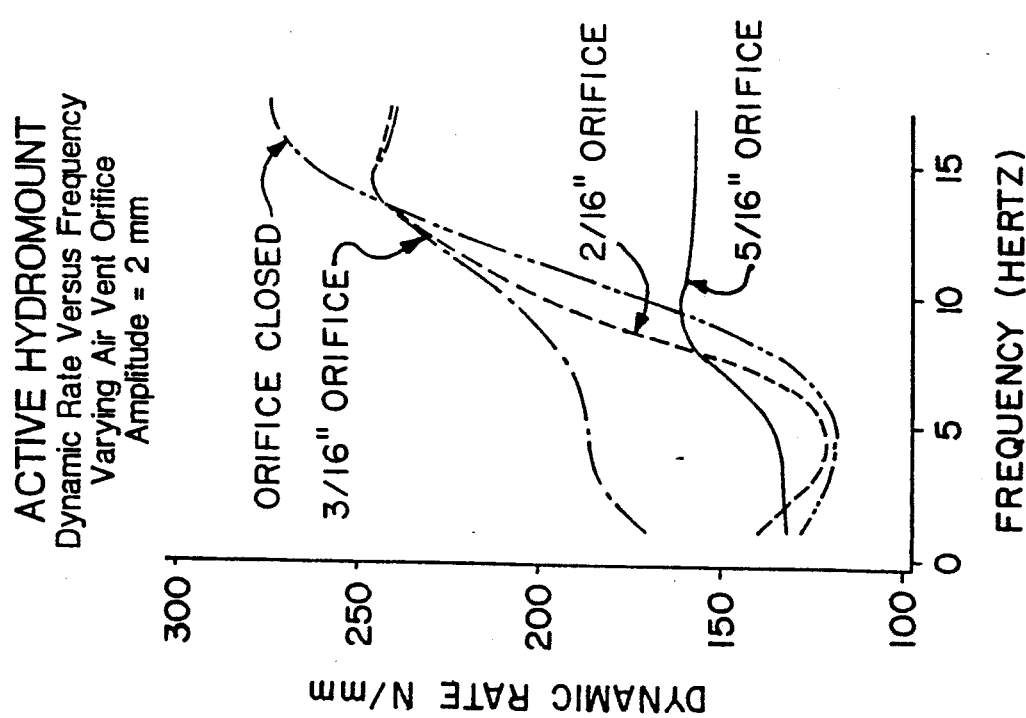
FIG. 9 is another test data graph showing a comparison of the dynamic rates of a decoupler in the modes of either a closed orifice, three different orifice sizes.

It may be seen from the graphs in FIGS. 6 through 10 that when either the cavity 54 of the decoupler 46 or the cavity 86 of the decoupler 82 is fully vented through an open port or a large orifice to the atmosphere so that the air can move freely in and out and the diaphragm can easily flex inwardly, this mode decouples the damping effect of the device and little or no damping occurs. When a diaphragm such as the diaphram 56 shown in FIG. 3 is drawn down into the cavity 54 so that it is no longer free to flex, then damping occurs due to the movement of liquid through the damping channel 44. Connection of the cavity 54 to a vacuum or to a check valve will result in the air being drawn from the cavity, thereby drawing the diaphragm into the cavity. The graphs in FIGS. 9 and 10 illustrate that when the cavity of the decoupler is connected to orifices of varying size, the least damping will occur when using large orifices and the most damping will occur when using small orifices.

Thus, it can be seen that any operating mode which permits increased flexing of the diaphragm will reduce the amount of damping and any mode which reduces the flexing of the diaphragm will increase the amount of damping.

It should be understood that various combinations of valves can be used, however, using a combination of valves such as that shown in FIGS. 1 and 5 will give versatility in the range of control over the amount of decoupling by providing several options for effecting the control of damping.

These and various other modifications can be made in the embodiments shown herein without departing from the scope of the invention.

What is claimed is:

1. A hydro-elastic engine mount for mounting an engine on a vehicle frame said mount comprising:
   (A) a first end member;
   (B) a second end member spaced in an axial direction from the first end member;
   (C) an annular elastomeric spring element sealingly attached to the first end member;
   (D) an annular sidewall extending between the elastomeric spring element and the second end member to form an enclosed chamber between the first and second end members;
   (E) a fixed partition inside the enclosed chamber dividing it into a main fluid chamber and an auxiliary fluid chamber;
   (F) said partition containing a damping channel therethrough which permits fluid to flow back and forth between the main fluid chamber and the auxiliary fluid chamber when certain vibration conditions occur to provide relative vibration damping between the first and second end members; and
   (G) a coupling/decoupling means mounted inside the main fluid chamber to alternately couple and at least partially decouple the vibration damping action of the fluid flow through the damping channel said coupling/decoupling means comprising:

(1) a rigid annular body member having a concave wall forming a cavity with an open side facing on the inside of the main fluid chamber, (2) a flexible extensible elastomeric diaphragm sealingly attached to the rigid body member and covering the open side of the cavity at a spaced distance from the concave wall of the body member, said diaphragm being deflectable into the cavity a distance relative to the pressure differential between the fluid pressure in the main fluid chamber and the air pressure in the cavity, one surface of the diaphragm facing the cavity and the opposite surface thereof lying within the main fluid chamber and being directly exposed to the interior of said chamber, (3) the body member having a port extending through the concave wall thereof and in communication with the exterior of the engine mount to permit the flow of air in and out of the cavity, and (4) means to control the flow of air through the port in and out of the cavity to effect pressure changes within the cavity and thereby change the amount of deflection of the diaphragm.

2. The engine mount as claimed in claim 1 wherein the means to control the flow of air in and out of the cavity of the coupling/decoupling means is a valve means operatively connected to the port in the wall of the body member, said valve means alternately connecting the port to a one way check valve permitting air to be only exhausted from the cavity, or connecting the port to at least one orifice of a specified size to permit air to flow in and out of the cavity at a predetermined rate.

3. The engine mount as claimed in claim 2 wherein the valve means alternately connects the port to a plurality of orifices of different sizes to vary the rate of flow of air in and out of the cavity depending upon what size orifice is selected by the valve means.

4. The engine mount as claimed in claim 1 wherein the rigid annular body member of the coupling/decoupling means extends around the inside circumference of the annular sidewall with the cavity therein facing radially inwardly into the main fluid chamber.

5. The engine mount as claimed in claim 1 wherein the means to control the flow of air in and out of the cavity of the coupling/decoupling means is a valve means operatively connected to the port in the wall of the body member, said valve means alternately connecting the port to one of a plurality of orifices of different sizes to vary the rate of air flow in and out of the cavity depending upon which size orifice is selected by the valve means, or closing off the port to seal existing air in the cavity.

6. The engine mount as claimed in claim 1 wherein the means to control the flow of air in and out of the cavity of the coupling/decoupling means is a valve means operatively connected to the port in the wall of the body member, said valve means alternately connecting the port to communicate with the exterior of the engine mount to effect complete decoupling of vibration damping, or closing off communication between the port and the exterior of the engine mount to seal in any air existing in the cavity of the body member thereby limiting the amount of deflection of the diaphragm to effect partial decoupling of the vibration damping, or connecting the port to a vacuum source to remove air from the cavity and draw the diaphragm into the cavity to effect full coupling of vibration damping.

7. In a fluid filled vibration isolator enclosed by an annular wall, an annular elastomeric spring and a pair of opposed end members, and having a fluid compression chamber and a fluid expansion chamber separated by a fixed partition except for a damping channel in said partition, through which fluid flows back and forth from one chamber to the other to provide vibration damping in response to certain vibration conditions imparted to the vibration isolator, the improvement comprising:

(A) coupling/decoupling means mounted inside the compression chamber to alternately couple and at least partially decouple the vibration damping action of the fluid flow through the damping channel said coupling/decoupling means comprising:

(1) a rigid annular body member extending around at least part of the distance around the inside of the compression chamber;

(2) said body member having a concave wall forming a cavity with an open side facing on the inside of the compression chamber;

(3) the body member having a port extending through the concave wall thereof and in communication with the exterior of the vibration isolator to permit the flow of air in an out of the cavity.

(4) a flexible extensible elastomeric diaphragm sealingly attached to the body member and covering the open side of the cavity at a spaced distance from the concave wall of the body member, one surface of the diaphragm facing the cavity and the opposite surface thereof lying within the main fluid chamber and being directly exposed to the interior of said chamber, (5) said diaphragm being deflectable into the cavity a distance relative to the pressure differential between the pressure in the compression chamber and the pressure in the cavity thus to decrease the fluid pressure level, thereby decreasing the quantity of fluid being pushed through the damping channel; and (6) means regulating the deflection of the diaphragm in response to pressure variations within the compression chamber, to effect the coupling or the desired amount of decoupling of vibration damping by the vibration isolator.

8. The vibration isolator as claimed in claim 7 wherein the means regulating the deflection of the diaphragm is a valve means alternately connecting the port to a one way check valve permitting air to be only exhausted from the cavity, or connecting the port to an opening to permit the air to flow in an out of the cavity in response to changes in internal pressure within the compression chamber.

9. The vibration isolator as claimed in claim 8 wherein the valve means alternately connects the port to a plurality of orifices of different sizes to vary the rate of flow of air in and out of the cavity depending upon what size orifice is selected by the valve means.

10. The vibration isolator as claimed in claim 7 wherein the means regulating the deflection of the diaphragm is a valve means operatively connected to the port, said valve means alternately connecting the port to one of a plurality of orifices of different sizes to vary the rate of air flow in and out of the cavity depending upon which size orifice is selected by the valve means, or closing off the port to seal existing air in the cavity.

11. The vibration isolator as claimed in claim 7 wherein the means regulating the deflection of the diaphragm is a valve means operatively connected to the port, said valve means alternately connecting the port to communicate with the exterior of the vibration isolator to effect complete decoupling of vibration damping, or closing off communication between the port and the exterior of the vibration isolator to seal in any air existing in the cavity of the body member thereby limiting the amount of deflection of the diaphragm to effect partial decoupling of the vibration damping, or connecting the port to a vacuum source to remove air from the cavity and draw the diaphragm into the cavity to fully effect coupling of vibration damping.

* * * * *